US006787061B1

(12) United States Patent
Miller (10) Patent No.: US 6,787,061 B1
(45) Date of Patent: Sep. 7, 2004

(54) COPPER POLISH SLURRY FOR REDUCED INTERLAYER DIELECTRIC EROSION AND METHOD OF USING SAME

(75) Inventor: Anne E. Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/715,690

(22) Filed: Nov. 16, 2000

(51) Int. Cl.[7] .................. C09K 13/00; C09K 13/06; H01L 21/302
(52) U.S. Cl. .................. 252/79.1; 252/79.4; 438/692
(58) Field of Search .................. 252/79.1, 79.4; 438/692

(56) References Cited

U.S. PATENT DOCUMENTS

| | | | |
|---|---|---|---|
| 5,527,423 A | * | 6/1996 | Neville et al. .......... 156/636.1 |
| 5,575,706 A | * | 11/1996 | Tsai et al. .......... 451/415 |
| 5,700,383 A | * | 12/1997 | Feller et al. .......... 216/88 |
| 5,728,308 A | | 3/1998 | Muroyama |
| 5,830,265 A | | 11/1998 | Tsang et al. |
| 5,904,159 A | * | 5/1999 | Kato et al. .......... 134/7 |
| 5,954,997 A | * | 9/1999 | Kaufman et al. .......... 252/79.1 |
| 6,045,435 A | | 4/2000 | Bajaj et al. |
| 6,083,419 A | * | 7/2000 | Grumbine et al. .......... 252/79.1 |

* cited by examiner

*Primary Examiner*—Nadine G Norton
*Assistant Examiner*—Lynette T. Umez-Eronini
(74) *Attorney, Agent, or Firm*—Blakely, Sokoloff, Taylor & Zafman LLP (57) ABSTRACT

Slurries for use in the chemical mechanical polishing (CMP) of copper and copper diffusion barriers that reduce pattern sensitive erosion of an underlying dielectric layer include at least one surfactant. Inclusion of surfactants, such as cetyl-trimethylammonium bromide in a slurry mixture can reduce pattern sensitive erosion of dielectric materials such as silicon oxide, and fluorinated oxides of silicon that would otherwise occur during CMP of copper and copper diffusion barriers as is typical in the formation of copper interconnect lines in integrated circuits.

14 Claims, 8 Drawing Sheets

| Abbreviation | Name | Chemical Formula | Surfactant Type | ILD Interaction Site |
|---|---|---|---|---|
| PVA 0.5 wt% | Polyvinylalcohol | [-CH$_2$CH(OH)-](MW=85,000-146,000) | nonionic | Si-O-Si, OH |
| C18PEO(2) | Polyoxyethlene(2)stearylether | C$_{18}$H$_{37}$(OCH$_2$CH$_2$)$_2$OH | nonionic | Si-O-Si, OH |
| C18PEO(10) | Polyoxyethelene(10)stearylether | C$_{18}$H$_{37}$(OCH$_2$CH$_2$)$_{10}$OH | nonionic | Si-O-Si, OH |
| C18PEO20 | Polyoxyethelene(20)stearylether | C$_{18}$H$_{37}$(OCH$_2$CH$_2$)$_{20}$OH | nonionic | Si-O-Si, OH |
| DMS-EO | Ethylene oxide modified | Me$_3$SiOMeSi(O)[C$_2$H$_4$)$_3$(OCH$_2$CH$_2$)xOMe]][MeSiO](SiMe$_3$)* | nonionic | Si-O-Si, OH |
| FSP | Phosphate fluorsurfactant | [F(CF$_2$CF$_2$)zCH$_2$CH$_2$O]xP(O)(ONH$_4$)y | anionic | SiOH$_2^+$ |
| FSK | Amphoteric fluorsurfactant | F(CF$_2$CF$_2$)yCH$_2$CH$_2$CHO(Ac)CH$_2$N+(CH$_3$)$_2$CH$_2$COO- | amphoteric | SiO-, SiOH$_2^+$ |
| CTAB | Cetyltrimethylammonium bromide | C$_{16}$H$_{33}$N(CH$_3$)$_3$Br | cationic | SiO- |
| Ethoquad 18/25 | Octadecylmethylpolyoxyethylene (15)ammonium | RN(CH$_3$)[CH$_2$CH$_2$O~7.5H][CH$_2$CH$_2$O~7.5]+HCl* | cationic | SiO- |
| K-Oleate 0.5 | Potassium Oleate | CH$_3$(CH$_2$)$_7$CH=CH(CH$_2$)$_7$CO$_2$K | anionic | SiOH$_2^+$ |

*Me=CH$_3$, R=Hydrocarbon group, alkyl=Alkyl group

FIG. 10

COPPER POLISH SLURRY FOR REDUCED INTERLAYER DIELECTRIC EROSION AND METHOD OF USING SAME

BACKGROUND OF THE INVENTION

1. Field of the Invention

The invention relates generally to the manufacture of integrated circuits, and more particularly to slurries for use in chemical mechanical polishing of copper, copper alloys, and copper diffusion barriers in the formation of interconnect lines on integrated circuits.

2. Background

Advances in semiconductor manufacturing technology have led to the integration of tens, and more recently hundreds, of millions of circuit elements, such as transistors, on a single integrated circuit (IC). To achieve such dramatic increases in the density of circuit components has required semiconductor manufacturers to scale down the size of the circuit elements and the interconnection structures used to connect the circuit elements into functional circuitry, as well as scaling down the spacing between the interconnect.

Manufacturers of integrated circuits have recently shown great interest in replacing conventional aluminum and aluminum alloys with copper to form signal and power interconnections on integrated circuits. Copper interconnect lines have a number of advantages over conventional aluminum-based metallization schemes, including but not limited to, improved electromigration characteristics and lower resistivity per cross-sectional area. These are important attributes that make copper a preferred metallization scheme for manufacturers that continue to shrink the dimensions and line widths of the various elements that make up an integrated circuit.

Copper interconnect on integrated circuits is typically formed by way of a damascene process. This is in contradistinction to aluminum-based interconnections which are typically formed by way of the well-known subtractive etch process. As is known in this field, copper damascene processing involves defining an interconnection by forming trenches in a layer of insulating material having a planarized top surface, depositing a metal, such as copper, over the insulating material and into the trenches. If copper is the metal that is deposited, then a barrier layer that acts to reduce or eliminate the diffusion of copper into the insulating material is typically disposed over the insulating material prior to the deposition of the copper. The damascene process subsequently concludes with the removal of both the copper and barrier layer from the top surface of the insulating material, leaving the metal in the trenches such that these now represent individual interconnect lines.

The removal of the copper referred to above is typically achieved by way of chemical mechanical polishing. However, as the spacing between interconnect lines becomes very small, it has been observed that erosion of the insulating layer is greater in regions where interconnect density is greater. In other words, CMP with a conventional Cu polish has been observed to produce the aforementioned undesirable result of pattern sensitive erosion. This occurs even though many conventional slurries have a high selectivity to the barrier layer or a high selectivity to the oxide dielectric layer. This phenomenon is sometimes referred to as pattern sensitive erosion, the pattern density effect, the geometric effect, or similar expressions.

The non-uniform polishing that occurs due to the pattern density effect is undesirable because, among other things, it makes subsequent planarization operations more difficult, it makes the formation of trenches, and vias from upper interconnect levels more difficult, and it changes the designed for capacitance and resistance characteristics of the interconnect lines which in turns leads to compromised levels of performance and reliability.

What is needed are slurries and methods for polishing copper interconnects on integrated circuits that reduce the magnitude of pattern sensitive erosion of an interlayer dielectric material.

BRIEF DESCRIPTION OF THE DRAWINGS

Overview

Figure 1:
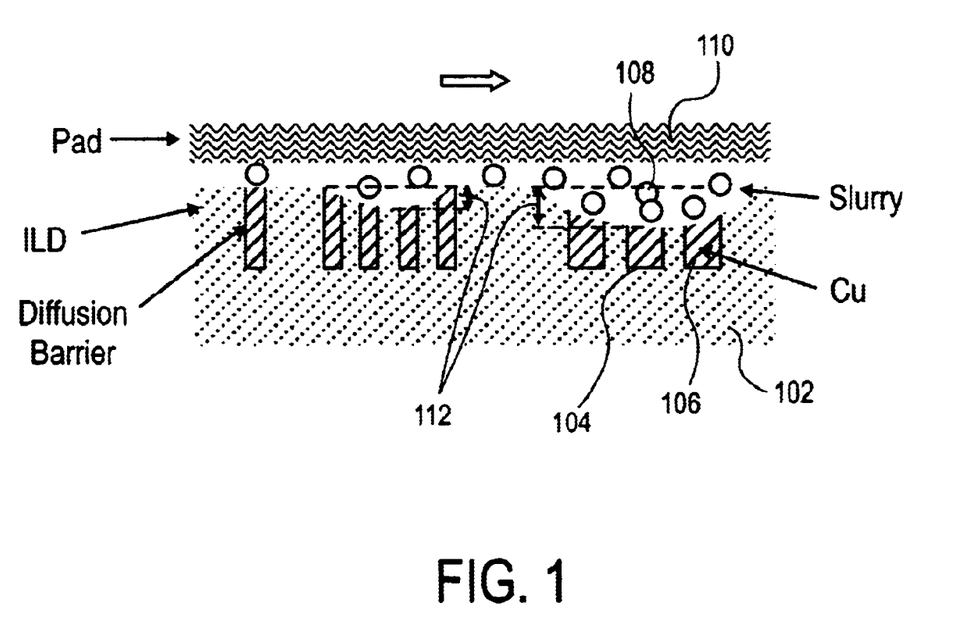
FIG. 1 is a schematic cross section of a portion of a wafer showing erosion of the ILD layer as a result of conventional CMP.

Copper interconnect lines on integrated circuits are typically formed by damascene metallization processing which includes removal of excess copper and copper barrier layers by way of CMP. When CMP is performed with conventional slurries, pattern sensitive erosion is observed in areas of the integrated circuit having high interconnect density. FIG. 1 illustrates the problem of increased levels of erosion in the high density interconnect areas. As shown in FIG. 1, an interlayer dielectric (ILD) 102, has trenches lined with a copper diffusion barrier 104, and further has copper metal 106 overlying the diffusion barriers 104, and essentially filling the trenches. A polishing pad 110, together with a plurality of slurry particles 108 are shown to illustrate the polishing process which produces erosion 112. Pattern sensitive erosion produces greater levels of erosion in areas where the ratio of metal to dielectric is high, than in areas of the integrated circuit where interconnect lines are relatively sparse, and therefore the width of the interlayer dielectric, i.e., the space between interconnect lines is greater.

One approach to solving this problem for integrated circuits which use Ta as the Cu diffusion barrier involves a two-step polishing process and the use of slurry having a high selectivity to Ta. However, the thickness of the barrier layer is not sufficient to protect the dense structure from erosion. It is also desirable to polish the copper and barrier layer as a one-step operation. Attempts to solve either of these problems by simply creating a slurry with a high ILD selectivity (e.g., <10 angstroms per min $SiO_2$ removal rate) have not improved dishing or erosion issues.

Embodiments of the present invention achieve the desired performance improvement for copper polishing by providing a slurry that includes a surfactant. The slurry in accordance with the present invention is used to remove excess Cu and Cu diffusion barrier while substantially reducing pattern sensitive erosion of the ILD. Embodiments of the present invention include a surfactant in the slurry that interacts sufficiently to improve the pattern density effect.

Slurries for use in the chemical mechanical polishing (CMP) of copper and copper diffusion barriers that reduce pattern sensitive erosion of an underlying dielectric layer in accordance with the present invention, include at least one surfactant. Inclusion of surfactants, such as cetyltrimethylammonium bromide in a slurry mixture can reduce pattern sensitive erosion of dielectric materials such as silicon oxide, and fluorinated oxides of silicon that would otherwise occur during CMP of copper and copper diffusion barriers as is typical in the formation of copper interconnect lines in integrated circuits.

Figure 2:
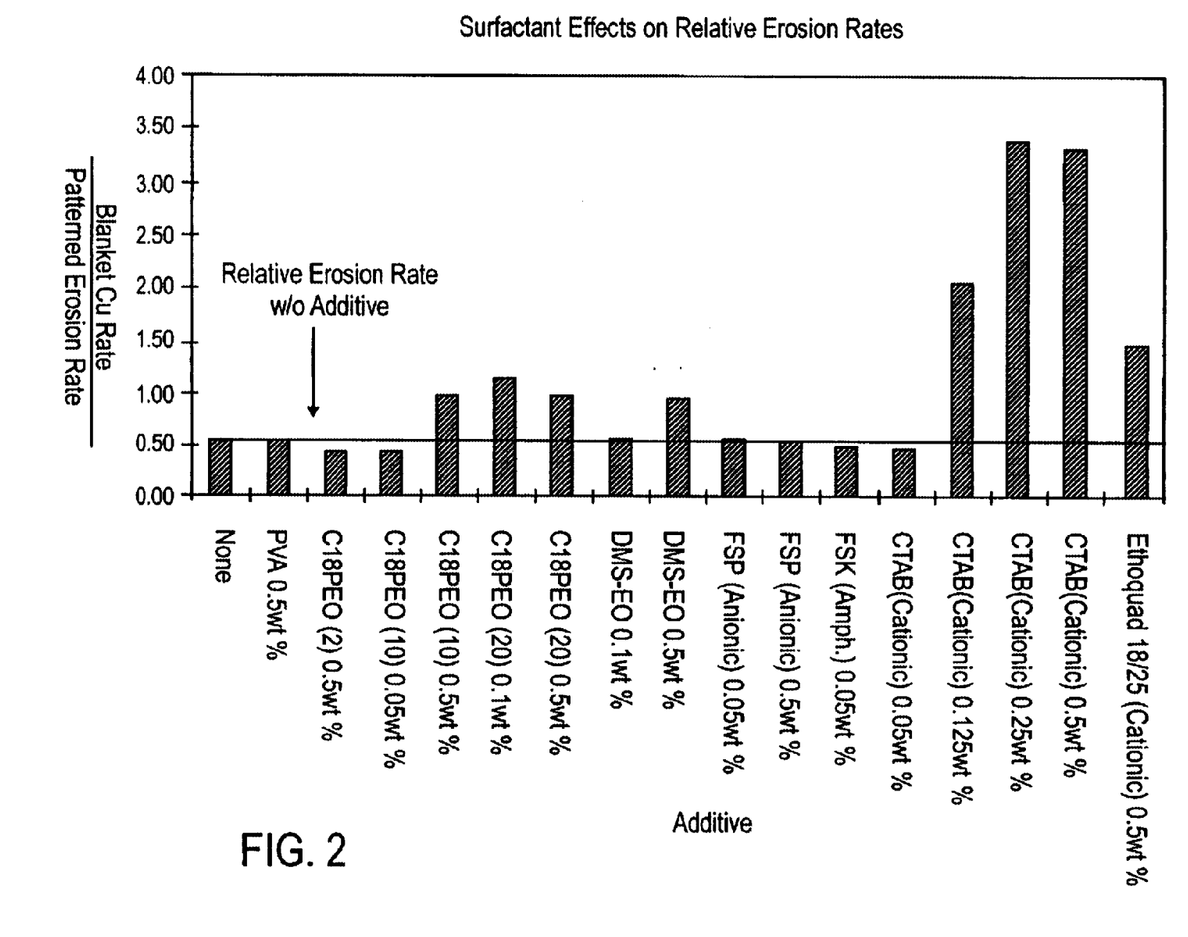
FIG. 2 is a bar graph showing the relative effectiveness of various surfactants on reducing pattern sensitive erosion.
Figure 10:
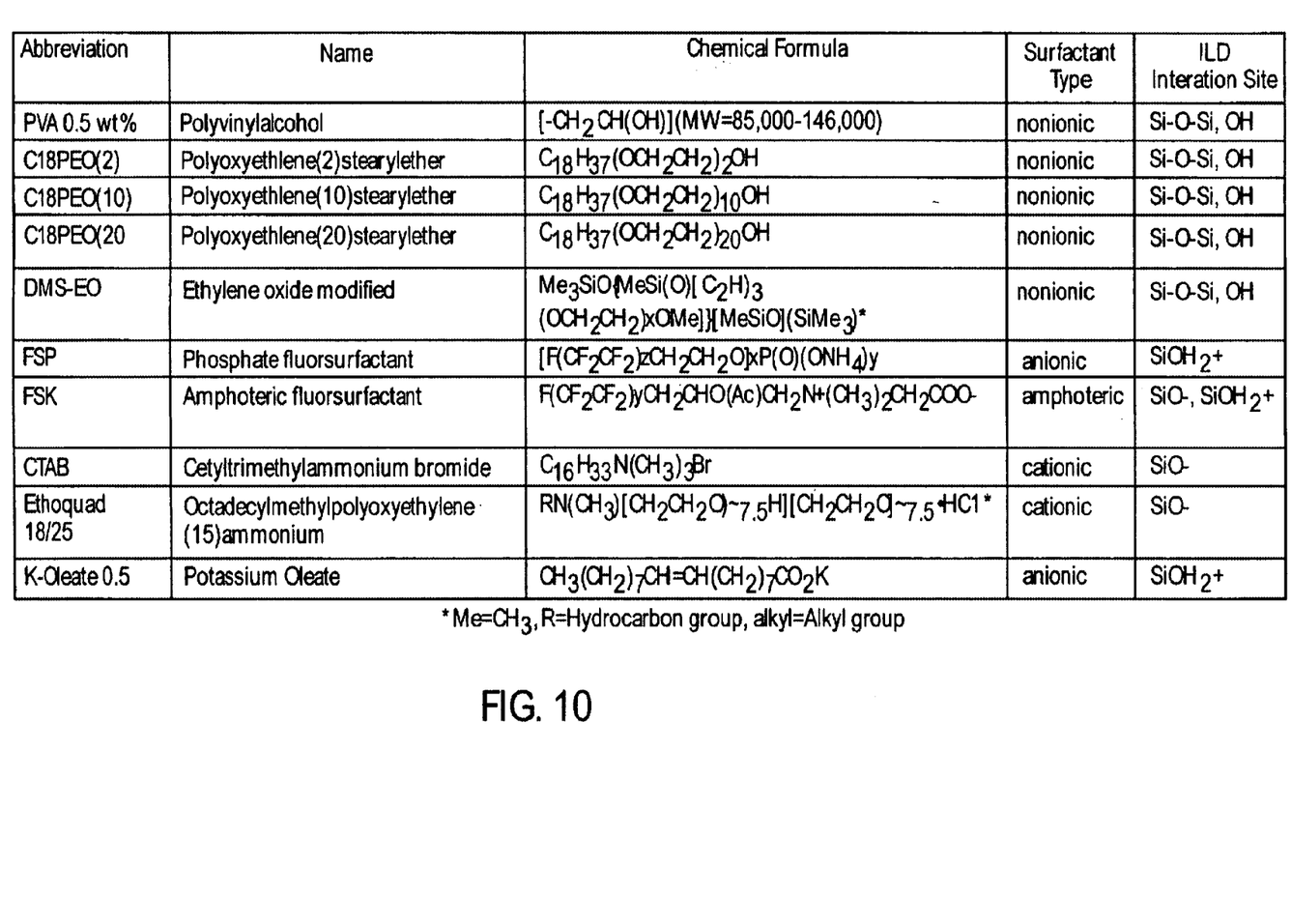
FIG. 10 is a table of chemical formulations of surfactants.

Referring to FIG. 2, a bar graph is provided that indicates the pattern density effect improvements, and the barrier selectivity improvements that result from the use of various surfactant additives. The first five additives shown in FIG. 2 are non-ionic surfactants, the sixth additive is an anionic surfactant, the seventh additive is an amphoteric surfactant, and the last three additives are cationic tertiary amine salts. Detailed chemical formulations are given in FIG. 10 In the experiments from which this data is obtained, the patterned erosion rate is measured on an SiOF patterned wafer based on a 3 mm×3 mm structure with 6 micron wide metal lines, a spacing between the metal lines of 0.8 microns, and an etch depth of 6,000 angstroms. The base slurry without additive has a nearly zero (i.e., <10 angstroms per minute) blanket SiOF polish rate. This would correspond to a Cu:SiOF selectivity of >200.

Methods for forming copper based interconnect lines on integrated circuits in accordance with the present invention are described herein which include various polishing parameter ranges such as, for example, polishing pressures, spindle rpm, wafer rpm, slurry flow rates, delta P, and the use of a new class of slurry formulations.

Terminology

The terms, chip, integrated circuit, monolithic device, semiconductor device, and microelectronic device, are often used interchangeably in this field. The present invention is applicable to all of the above as they are generally understood in the field.

The expression, low dielectric constant material, refers to materials having a lower dielectric constant than silicon dioxide. For example, organic polymers, amorphous fluorinated carbons, nanofoams, silicon based insulators containing organic polymers, fluorine doped oxides of silicon, and carbon doped oxides of silicon have lower dielectric constants than silicon dioxide.

Erosion, as used herein, refers to the amount of a layer, typically an interlayer dielectric, that is removed during the polishing of a metal damascene structure. Erosion is measured as a thickness, or distance, and more particularly, it is a measure of the distance between the original surface of the layer and its post-polish surface. Erosion is generally an undesirable overpolishing. Examples of erosion can be seen in FIG. 1. Typically, the erosion, or interlayer dielectric loss, is greater for structures such as serpentines, and other patterns of high interconnect density, where the metal density is high relative to that of the dielectric, than it is for other areas of an integrated circuit having a relatively lower density of metal interconnect lines.

The letter k, is often used to refer to dielectric constant. Similarly, the terms high-k, and low-k, are used in this field to refer to high dielectric constant and low dielectric constant respectively, where high means greater than the dielectric constant of silicon dioxide, and low means lower than the dielectric constant of silicon dioxide.

Reference herein to "one embodiment", "an embodiment", or similar formulations, means that a particular feature, structure, or characteristic described in connection with the embodiment is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

Slurry

A first exemplary formulation (Slurry Formulation #1) of a slurry in accordance with the present invention includes, per liter of final slurry, a surfactant such as 0.25 wt % cetyltrimethylammonium bromide, a chelating buffer system, such as 2.57 g/l citric acid and 3.66 g/l potassium citrate, an abrasive, such as 1.1 vol % 5 nm silica (surface area=500 $m^2/g$), an oxidizer, such as 3.2 wt % hydrogen peroxide, and a corrosion inhibitor, such as 0.085 M/l benzotriazole. Such a slurry formulation has a pH of 3.8, and a slurry density of 1.03 g/ml.

The chelating buffer system may also be described as a combination of a chelating agent and a buffering agent. The chelator and the buffer may be either the same or different constituents.

Various changes in the formulation of a slurry in accordance with the present invention may be made. Such slurries contain a surfactant of a type and concentration that reduces or eliminates pattern-sensitive erosion. For example, a surfactant such as cetyltrimethylammonium bromide from 0.0001 M to 0.1 M may be used. A preferred range for cetyltrimethylammonium bromide is from 0.003 M to 0.075 M. Alternatively, cetyltrimethylammonium hydroxide may be used as the surfactant. In a further alternative embodiment, cetyltrimethylammonium bromide and cetyltrimethylammonium hydroxide are both used in the slurry of the present invention. The hydroxide, and hydroxide/bromide combination appear to give better results in terms of corrosion. Whereas the cetyltrmethylammonium cation controls the pattern sensitive erosion. An abrasive, such as $SiO_2$ from 0.25 to 10 vol. % may be used. A preferred range of $SiO_2$ abrasive is 0.50 to 2 vol. %. A chelating agent such as citric acid/potassium citrate, or ammonium bicitrate/potassium citrate may be used where the total citric acid plus citric acid salt concentration is between 0.02 M and 0.1 M inclusive. A buffer such as citric acid/potassium citrate may be used, where the total citric acid plus citric acid salt concentration is between 0.02 M and 0.1 M inclusive. A corrosion inhibitor such as benzotriazole may be used in a range of concentrations from 0.001 M to 0.05 M. Similarly, a corrosion inhibitor such as cetyltrimethylammonium bromide may be used in a range of concentrations from 0.001 M to 0.1 M, and preferably in the range of 0.003 M to 0.075 M.

In alternative embodiments of the present invention, the surfactant chosen to be combined into the slurry mixture may be a cation surfactant such as, for example, a quaternary ammonium halide, or a quaternary ammonium hydroxide; or a nonionic surfactant such as, for example, a dimethyl silicone ethylene oxide, or an alkyl polyethylene oxide. Furthermore, the surfactant may be dodecyltrimethylammonium chloride, dodecyltrimethylammonium bromide, cetyltrimethylammonium chloride, octadecylmethylpolyoxyethyleneammonium chloride, or an alkyltrimethylammonium halide wherein the alkyl group has more than twelve carbons.

A slurry in accordance with the present invention generally has a pH in the range of 3 to 6, and a density in the range of 1.02 to 1.05.

Process

In the following descriptions, it will be recognized by those skilled in this field that the numerical values of the various parameters are to be read with conventionally understood accuracies and therefore the illustrative embodiments are not meant to be unnecessarily limited.

In one embodiment, copper is polished with a slurry (such as, for example, Slurry Formulation #1, described above), under the following conditions: an IPEC 576 Orbital Polisher (from Speed-Fam IPEC, 305 North $54^{th}$ Street, Chandler, Ariz. 85226), pressure of 2 psi, spindle rpm of 440, wafer rpm of 27, slurry flow rate of 100 ccm, delta P of −0.4 psi, a IC1000 pad, and a suba4 subpad (from Rodel, 3804 East Watkins Street, Phoenix, Ariz. 85034). On blank test wafers the following the results were obtained: a copper removal rate of 2130 angstroms per minute, an SiOF ILD removal rate of <10 angstroms per minute, a static etch rate of 8 angstroms per minute, a Ta barrier layer removal rate of 20 angstroms per minute and a TaN barrier layer removal rate of 41 angstroms per minute. In a 90% dense structure the following results are obtained: 431 angstroms per minute erosion rate.

Figure 3:
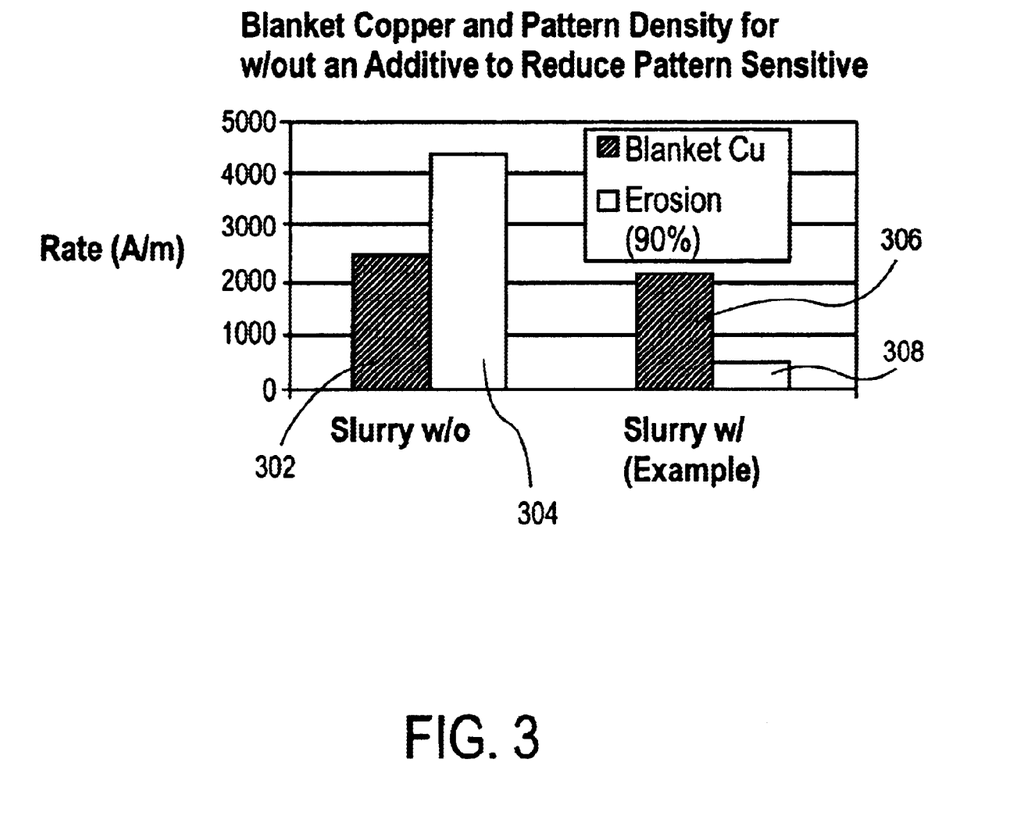
FIG. 3 is a bar graph showing the relative removal rates of Cu and ILD using slurries with and without a surfactant additive.

Referring to FIG. 3, an example of the reduction of the rate of pattern sensitive erosion with the use of a slurry in accordance with the present invention is shown. FIG. 3 is a bar graph and shows a first bar 302 representing the removal rate of blanket copper. This is the polish rate measured at pressure of 2 psi, spindle rpm of 440, wafer rpm of 27, slurry flow rate of 100 ccm, delta P—of 0.4 psi, a IC1000 pad, and a suba4 using a slurry without a surfactant, and a second bar 304 representing the ILD erosion rate in regions having 90% interconnect density using the same slurry. FIG. 3 also shows third bar 306 representing the removal rate of blanket copper using a slurry with a surfactant in accordance with the present invention, and a fourth bar 308 representing the ILD erosion rate in regions having 90% interconnect density using the same slurry. From the bar graph of FIG. 3, it can be seen that although there is a slight decrease in copper removal rate when chemical mechanical polishing is performed with the slurry of the present invention, there is a substantial decrease in the undesired pattern sensitive erosion rate of the ILD. Additionally, there is only a negligible difference between the removal rates of blanket SiOF ILD when using slurries with and without the surfactant in accordance with the present invention. This indicates that methods which address the removal rates of blanket ILD material may not be suitable for solving the problem of pattern sensitive ILD erosion.

Figure 4:
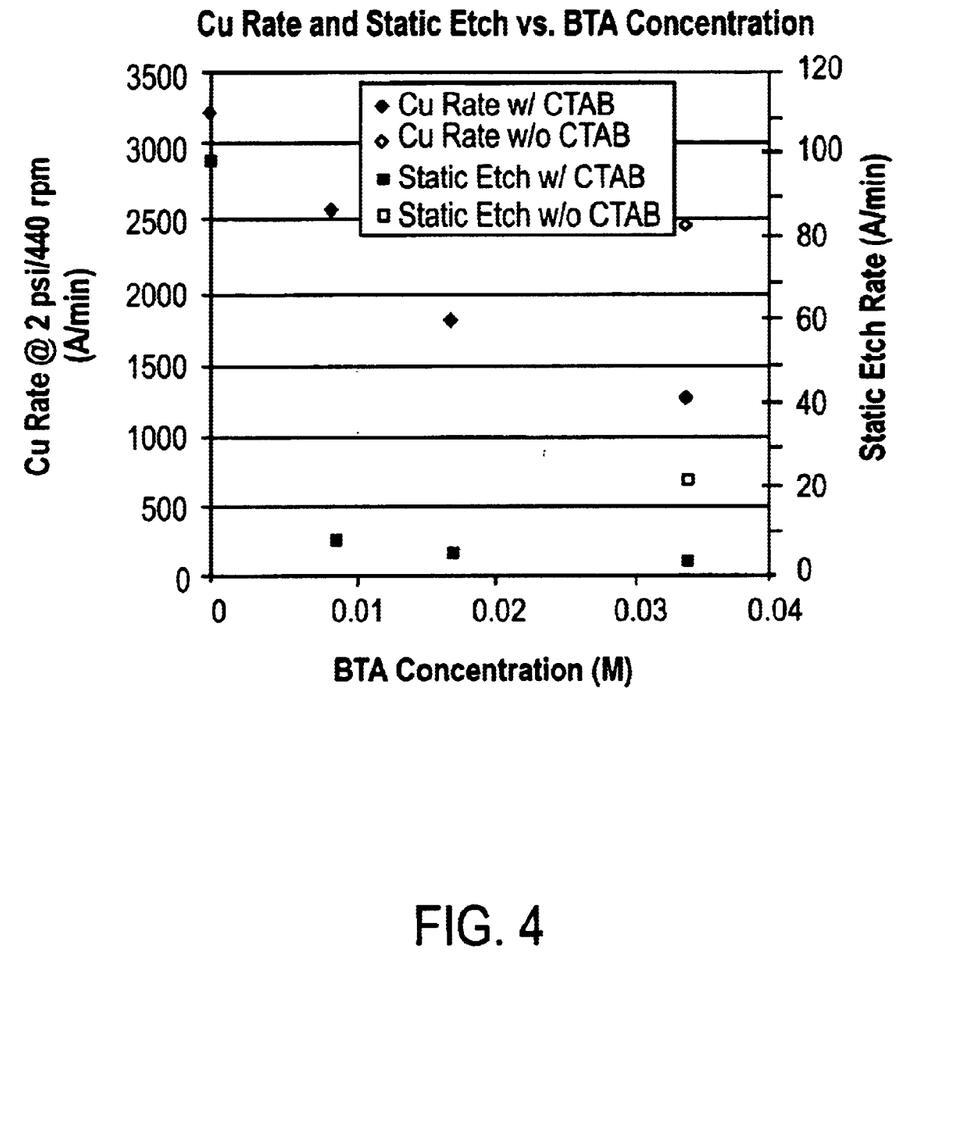
FIG. 4 is a scatter graph showing Cu removal rate and static etch rate as a function of the concentrations of benzotriazole and cetyltrimethylammonium bromide.

Referring to FIG. 4, the effect of benzotriazole and cetyltrimethylammonium bromide on polish rate and static etch rate are shown. As shown in FIG. 4, with the addition of cetyltrimethylammonium bromide, a reduction in static etch rate is achieved, thereby indicating that the concentration of benzotriazole could be reduced to enhance the copper etch rate.

Figure 5:
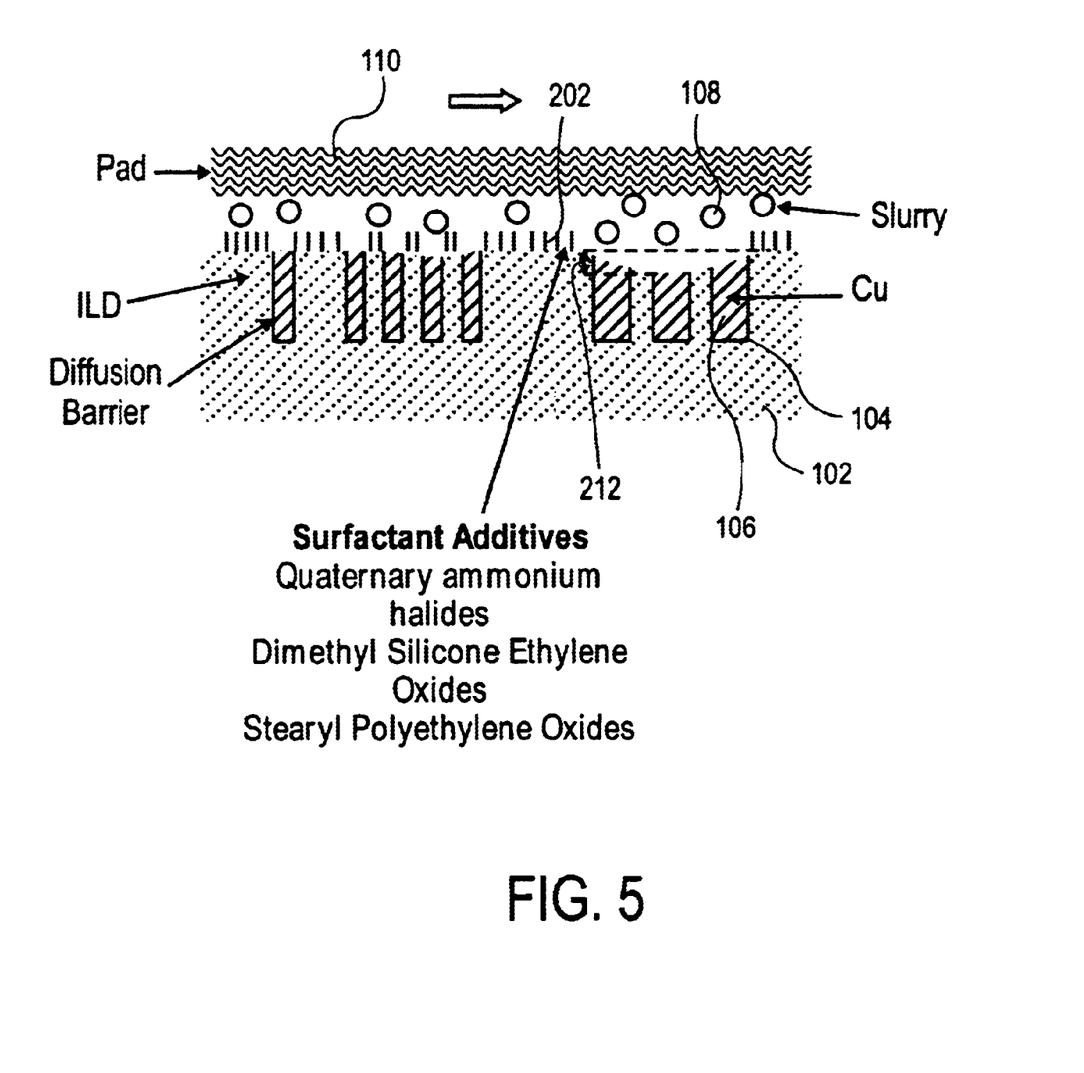
FIG. 5 is a schematic cross section of a wafer showing the improvement in pattern sensitive erosion with a surfactant additive in the slurry.

In accordance with the present invention, the magnitude of pattern sensitive erosion of the ILD during the removal of copper and a copper barrier layer is reduced by addition of, at least, one surfactant to the slurry. Referring to FIG. 5, an interlayer dielectric (ILD) 102, has trenches lined with a copper diffusion barrier 104, and further has copper metal 106 overlying the diffusion barriers 104, and essentially filling the trenches. A polishing pad 110, together with a plurality of slurry particles 108 are shown to illustrate the polishing process. Also shown in FIG. 5, are schematic representations of the surfactant additives 202 that are useful in reducing pattern sensitive erosion. As can be seen in FIG. 5, pattern sensitive erosion 212 is substantially reduced over what is produced in the prior art process of polishing copper. The surfactant combined with the slurry mixture is characterized by an ability to substantially prevent abrasive particles in the slurry from removing an oxide dielectric while allowing the removal of copper and tantalum-based copper diffusion barriers. ILD 102 may be a doped or undoped oxide of silicon. Various dopants such as, but not limited to, fluorine are often added to oxides of silicon in order to reduce the dielectric constant of the ILD. Although FIG. 5 shows the surfactant attaching to the ILD, it is understood that the surfactant may also attach to the abrasive particles depending on the particle surface chemistry.

Figure 6:
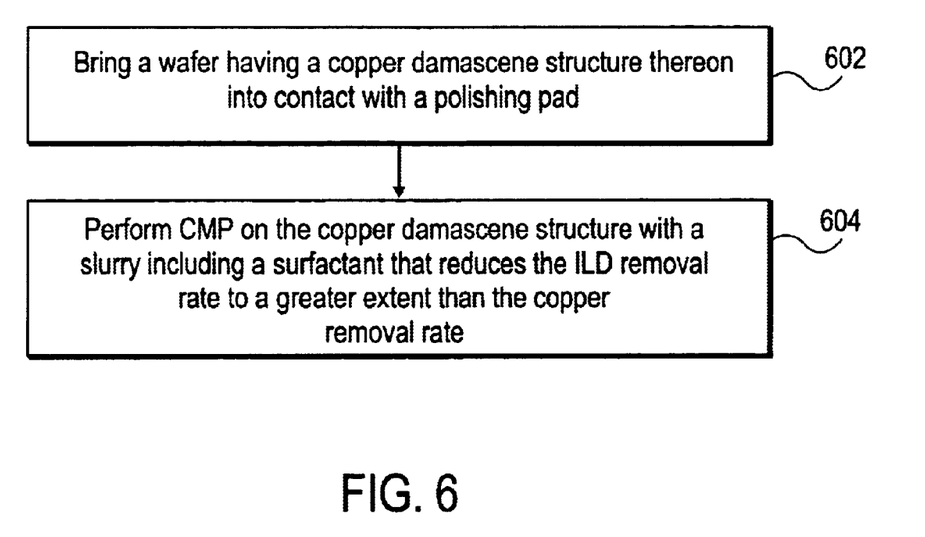
FIG. 6 is a flow diagram of a process of polishing copper in accordance with the present invention.

Referring to FIG. 6, a flow diagram of a method of polishing copper in accordance with the present invention is described. Those skilled in this field are familiar with the process of forming copper interconnect on integrated circuits. Cu interconnect lines and associated vias, are formed in accordance with a damascene metallization process. For example, a barrier layer and seed layer are deposited over the patterned ILD top surfaces including the trench and via openings. Cu is then plated and the excess copper is removed by a chemical mechanical polishing (CMP) process that includes the use of a slurry. The expression copper damascene structure may be used to describe the patterned ILD with copper diffusion barriers disposed between the ILD and an overlying layer of copper. At block 602 a wafer having a copper damascene structure thereon is brought into contact with a polishing pad. In an illustrative example of the present invention, an IC1000 pad with a suba4 subpad is used on an IPEC 576 Orbital Polisher. At block 604 a CMP operation is performed by polishing the copper damascene structure of the wafer with a polishing pad (described above) and a slurry including a surfactant that reduces the ILD removal rate to a greater extent than the copper removal rate. An example of such a surfactant is cetyltrimethylammonium bromide. As is well-known in the field of chemical mechanical polishing, the slurry is typically dispensed onto the polishing pad. Slurries may be pre-mixed and pumped to the dispensing outlet, or various ingredients of the slurry may be dispensed onto the polishing pad to form the final slurry at that point.

Figure 7:
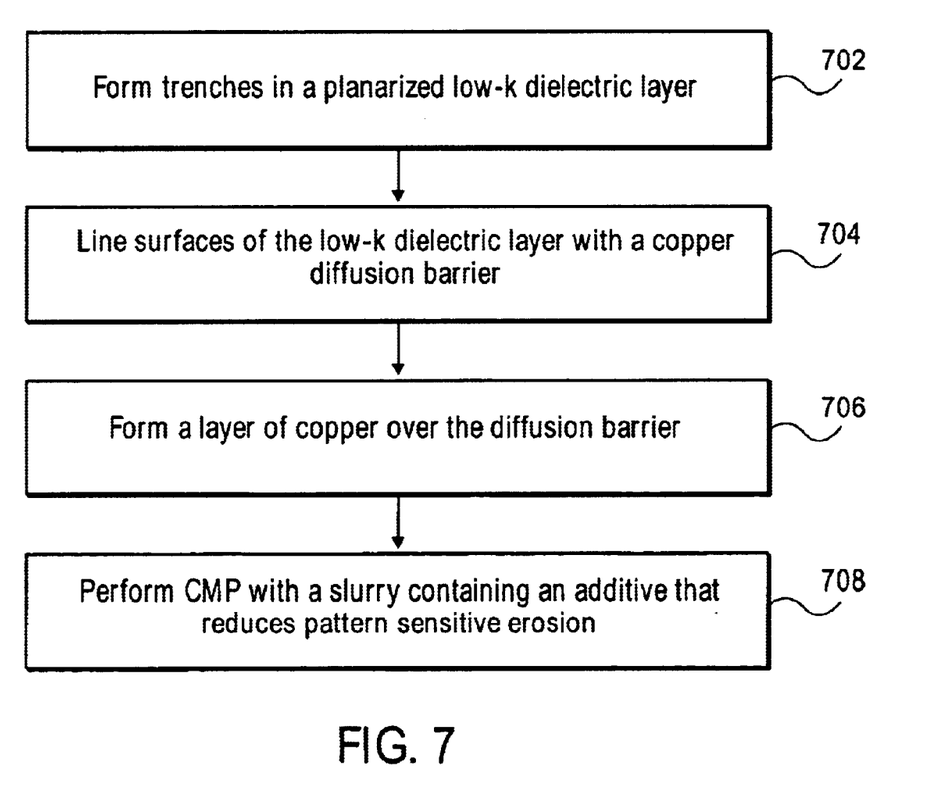
FIG. 7 is a flow diagram of a process of making copper interconnect on integrated circuits in accordance with the present invention.

FIG. 7 is a flow diagram of an illustrative embodiment of the present invention in which copper interconnect lines are formed. At block 702 trenches are formed in a planarized low-k dielectric layer by conventional patterning methods. Fluorinated silicon oxide (SiOF) is an example of a low-k dielectric. At block 704 the surfaces of the patterned low-k dielectric layer are covered, that is lined, with a copper diffusion barrier. Tantalum-based, i.e., tantalum or tantalum nitride, barrier layers are commonly used as copper diffusion barriers in integrated circuits. At block 706 a layer of copper is formed over the diffusion barrier. At block 708 excess copper is removed by chemical mechanical polishing with a slurry containing an additive that reduces pattern sensitive erosion.

Figure 8:
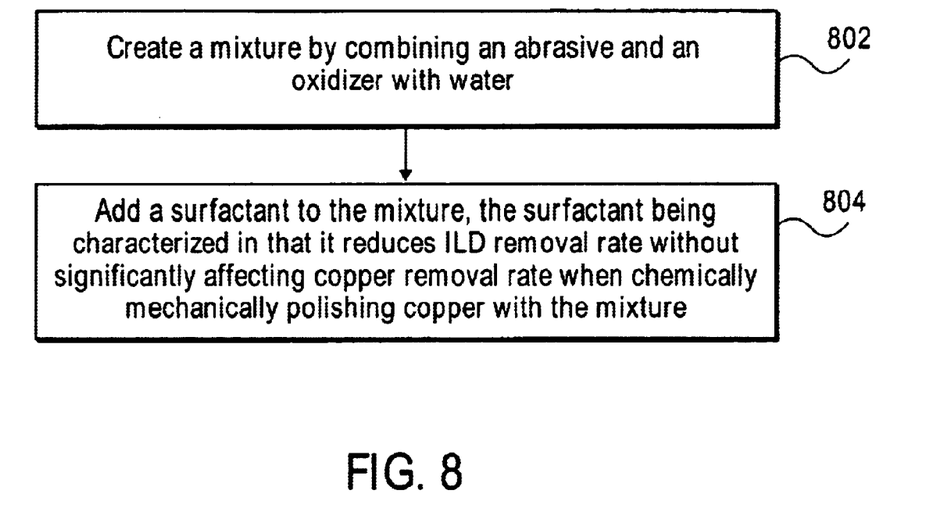
FIG. 8 is a flow diagram of a process of making a slurry in accordance with the present invention.

Referring to FIG. 8 an exemplary process for forming a slurry in accordance with the present invention is described. At block 802 a mixture is created by combining an abrasive and an oxidizer with water. At block 804 a surfactant is added to the mixture, the surfactant being characterized in that it reduces ILD removal rate without significantly affecting copper removal rate when chemically mechanically polishing copper with the mixture. Those skilled in the art and having the benefit of this disclosure will recognize that the specific order and rates of adding the various ingredients to the mixture may be varied without departing from the nature of the invention.

Figure 9:
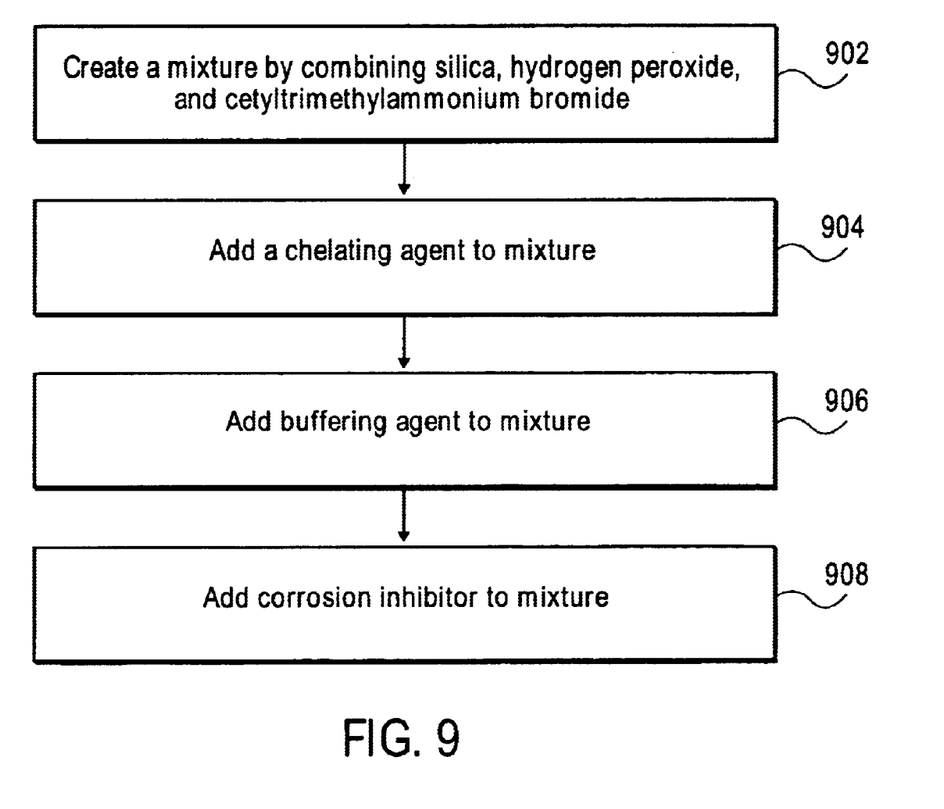
FIG. 9 is a flow diagram of a process of making a slurry in accordance with the present invention.

Referring to FIG. 9, a exemplary process of making a slurry in accordance with the present invention is described. At block 902 a mixture is created by combining silica, hydrogen peroxide, and cetyltrimethylammonium bromide. At block 904 a chelating agent is combined with the mixture. Potassium citrate is an example of a chelating agent that may be used in the present invention. At block 906 a buffering agent is combined with the mixture. Potassium citrate/citric acid is an example of a buffering chemistry that may be used in the present invention. At block 908 a corrosion inhibitor is combined with the mixture. Benzotriazole is an example of a corrosion inhibitor that may be used with the present invention.

It will be understood that the ingredients used to prepare a slurry in accordance with the present invention may be combined in different sequences. For example, water and benzotriazole may be combined, then buffers and chelating agents added, followed, respectively, by the addition of cetyltrimethylammonium bromide, silica, and hydrogen peroxide.

Conclusion

Embodiments of the present invention are useful at least for manufacturing integrated circuits and provide a slurry for chemical mechanical polishing of copper wherein the slurry contains an additive to reduce the geometric, or pattern-density effect on the ILD polish rate.

An advantage of some embodiments of the present invention is that integrated circuits with closely spaced damascene interconnects can be formed without significant ILD erosion.

Whenever copper is referred to herein, it should be understood that the present invention is applicable to various alloys of copper.

It will be understood that various other changes in the details, materials, and arrangements of the parts and operations which have been described and illustrated herein may be made by those skilled in the art without departing from the principles and scope of the invention as expressed in the subjoined Claims.

What is claimed is:

1. A copper polish slurry, comprising a mixture of:

a surfactant comprising an alkyltrimethylammonium halide; a chelating buffer system; an abrasive comprising silica; an oxidizer; and a corrosion inhibitor; wherein the slurry has a pH between 2.5 and 7.0.

2. The slurry of claim 1, wherein the surfactant comprises cetyltrimethylammonium bromide dissolved in the mixture.

3. The slurry of claim 1, wherein the surfactant comprises cetyltrimethylammonium chloride.

4. The slurry of claim 3, wherein the corrosion inhibitor comprises benzotriazole, and the oxidizer comprises hydrogen peroxide dissolved in the mixture.

5. The slurry of claim 1, wherein the chelating buffer system comprises ammonium bicitrate and potassium citrate dissolved in the mixture.

6. The slurry of claim 1, wherein the chelating buffer system is selected from the group consisting of citric acid/potassium citrate, and ammonium bicitrate/potassium citrate.

7. The slurry of claim 1, wherein the corrosion inhibitor is selected from the group consisting of benzotriazole and cetyltrimethylammonium bromide.

8. The slurry of claim 1, wherein the surfactant comprises between 0.003M and 0.075M cetyltrimethylammonium bromide in the mixture.

9. The slurry of claim 1, wherein the surfactant further comprises cetyltrimethylammonium hydroxide dissolved in the mixture.

10. The slurry of claim 1, wherein the surfactant comprises both cetyltrimethylammonium hydroxide and cetyltrimethylammonium bromide dissolved in the mixture.

11. The slurry of claim 1, wherein the abrasive comprising silica has a surface area of 500 $m^2/g$.

12. The slurry of claim 1, wherein the alkyltrimethylammonium halide has an alkyl group having more than twelve carbons.

13. The slurry of claim 1, wherein the slurry has a density of 1.03 g/ml.

14. The slurry of claim 1, wherein the oxidizer comprises hydrogen peroxide; and the chelating buffer system comprises citric acid and potassium citrate.

* * * * *